United States Patent [19]

Sarugaku et al.

[11] Patent Number: 4,587,398

[45] Date of Patent: May 6, 1986

[54] WELD LINE SYSTEM AND METHOD FOR CONTROL

[75] Inventors: Shinichi Sarugaku, Narashino; Masao Tsuji, Funabashi, both of Japan

[73] Assignees: Hitachi Ltd., Tokyo; Hitachi Keiyo Engineering Co., Ltd., Chiba, both of Japan

[21] Appl. No.: 643,707

[22] Filed: Aug. 24, 1984

[30] Foreign Application Priority Data

Aug. 26, 1983 [JP] Japan ................. 58-154874

[51] Int. Cl.⁴ .............................. B23K 9/12
[52] U.S. Cl. ..................... 219/124.22; 219/125.12
[58] Field of Search ............ 219/124.22, 124.34, 219/124.03, 124.02, 125.12

[56] References Cited

U.S. PATENT DOCUMENTS

| | | | |
|---|---|---|---|
| 4,151,395 | 4/1979 | Kushner et al. | 219/125.12 |
| 4,249,061 | 2/1981 | Puschner | 219/124.22 |
| 4,316,075 | 2/1982 | Isoya et al. | 219/124.22 |
| 4,491,718 | 1/1985 | Cook et al. | 219/125.12 |

Primary Examiner—Clifford C. Shaw
Attorney, Agent, or Firm—Beall Law Offices

[57] ABSTRACT

A system and method for weld line profile control wherein an electrical quantity corresponding to the arc of a welding torch is detected and the deviation between the electrical quantity and a reference quantity is monitored so that correction movements of the welding torch relative to the weld line can be limited if the deviation exceeds a predetermined value. In more detail, an electrical quantity corresponding to the arc of one side waveform of a welding torch operating under the influence of a wave signal is detected and a reference quantity corresponding to the arc of the other side waveform of the welding torch is detected, and the deviation between the electrical quantity and the reference quantity is monitored to provide a signal limiting the correction movements of the welding torch relative to the weld line when the deviation exceeds a predetermined value.

22 Claims, 17 Drawing Figures

WELD LINE SYSTEM AND METHOD FOR CONTROL

FIELD OF THE INVENTION

The present invention relates to grooved butt welding or filler welding and, more particularly, to a weld line profiling control system for controlling the position of a welding torch by detecting the arc current or the voltage across the welding torch, i.e., an electrical quantity corresponding to the arc.

BACKGROUND OF THE INVENTION

The concept of profile-controlling the position of a torch so that it stays on a predetermined weld line, by detecting the arc current flowing through the welding torch, is alread known in the art.

According to one specific method, the detected value of the arc current is compared with a predetermined constant reference value, and the position of the welding torch is controlled in accordance with the result of the comparison. If the welding torch is weaving, for example, the detected value of the arc current at the center of the weaving pattern is compared with a predetermined reference value corresponding thereto, and the position of the welding torch is controlled in accordance with the result of the comparison.

Another specific method notes the weaving of the welding torch, in which the detected values of the arc current at either end of the weaving pattern are compared with each other by using one as a reference quantity, and control is effected in accordance with the result of the comparison. This method makes use of the phenomenon that, if the path of the welding torch strays to the right (or left) off the weld line along the groove, the arc current at the right end (or at the left end, respectively) of the weaving pattern becomes larger than that at the other end. However, this control system has a defect in that the arc is liable to break down. This is especially prominent under conditions in which the arc has a low stability, when the welding current is less than 200 Å or more than 300 Å, for example.

Moreover, under welding conditions producing a low arc stability, an unstable breakdown of arc takes place. If this phenomenon occurs, a prior-art control system will attempt to correct the relative position of the welding torch and the weld line, even though the welding torch has not deviated from the weld line, in accordance with the change in the electrical quantity due to the breakdown. Therefore, especially when conditions producing such frequent arc breakdowns continue for a long time, the welding torch often deviates from the weld line and, worse, can completely separate from the weld line so that it is difficult for the welding torch to follow the weld line.

SUMMARY OF THE INVENTION

The present invention has been conceived in view of the background thus far described, and has the object of providing a weld line profile-control system which has excellent following characteristics, even under conditions of low arc stability.

It is, therefore, an object of the present invention to provide an improved weld line profile control system.

It is another object to provide a weld line profile control system exhibiting a higher degree of fidelity while following a weld line in the presence of unstable welding arcs.

When the arc breaks down, as has been described above, the electrical quantity corresponding to the state of the art of the welding torch changes more than during steady-state welding. The present invention has been conceived in view of this and is characterized in that the deviation between an electrical quantity corresponding to the arc of the welding torch and a predetermined reference quantity is monitored so that the correction movements of the welding torch relative to the weld line can be limited if the deviation exceeds a predetermined value.

BRIEF DESCRIPTION OF THE DRAWINGS

The present invention will be more apparent from the following detailed description taken in conjunction with the accompanying drawings in which.

DETAILED DESCRIPTION OF THE INVENTION

Figure 1:
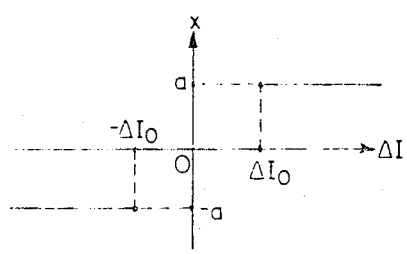
FIGS. 1 and 2 are graphs of the control characteristics of prior-art systems.
Figure 2:
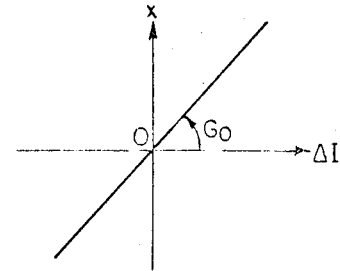

FIGS. 1 and 2 are graphs of the characteristics of a conventional control system for correcting and controlling any positional displacement of a welding torch from a path which is preset to profile a weld line, in accordance with its detection of an electrical quantity. These graphs show the case in which the arc current in the welding torch is used as the electrical quantity corresponding to the state of the arc of the welding torch. In the graphs, the abscissa $\Delta I$ indicates a deviation which corresponds to, for example, the difference between the detected value of the arc current and a predetermined constant reference value, the diference between the detected value of the arc current at the center of the weaving pattern and a corresponding reference value, or the difference between the detected values of the arc current at either end of the weaving pattern. This difference may either be a difference or else it could be a ratio of the values. The ordinate x indicates the correction applied to the welding torch. The control system shown in FIG. 1 is based on the concept that no predetermined correction is applied to the welding torch before the deviation $\Delta I$ exceeds $\Delta IO$ or $-\Delta IO$. In this case, the correction x is always a constant a. In this concept, the zone between the deviation $\Delta IO$ and the deviation $-\Delta IO$, in which the correction x is zero, is generally called the dead zone. The control system shown in FIG. 2 is based on the concept that a predetermined correction is applied in proportion to the deviation ΔI. In this graph, the gradient Go of the characteristic curve can be determined as required according to the characteristics of the control system.

Figure 3:
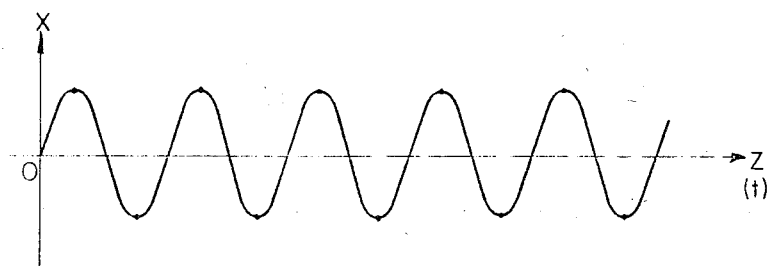
FIG. 3 shows the waveform of the weaving signal.
Figure 4:
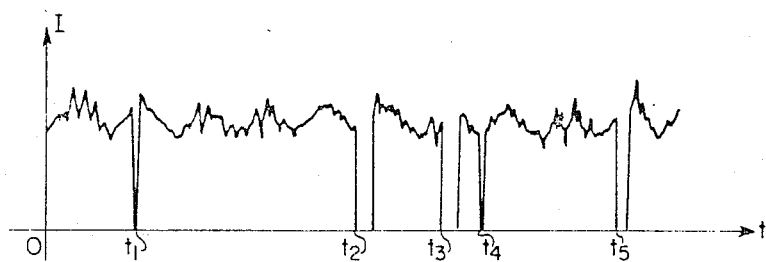
FIG. 4 shows the waveform of the arc current.
Figure 5:
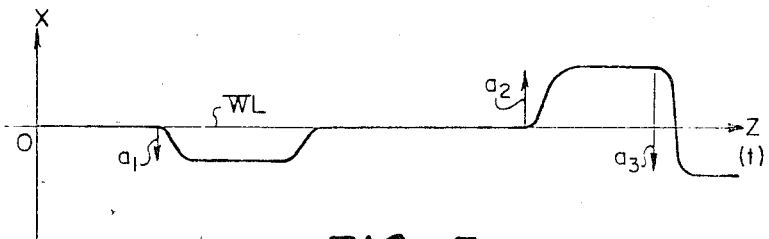
FIG. 5 shows the locus of the center position of weaving in a prior-art system.

Incidentally, a control system using carbon dioxide as a shielding gas is so inexpensive that it is in strong demand. However, this control system has a defect in that the arc is liable to break down. This is especially prominent under conditions in which the arc has a low stability, when the welding current is less than 200 Å or more than 300 Å, for example. Therefore, consider the case in which the welding torch is to be controlled by the control system of FIG. 1 or 2, under conditions that are liable to produce a breakdown of the arc. First the control system of FIG. 2 will be considered. FIGS. 3, 4 and 5 are graphs explaining the control system of which: FIG. 3 illustrates a weaving waveform; FIG. 4 illustrates the welding current; and FIG. 5 illustrates the path of the center position during weaving of the welding torch. In FIG. 5, the time axis t can be considered to be the weld line WL. In FIG. 4, breakages of the arc are indicated at times $t_1$, $t_2$, $t_3$, $t_4$ and $t_5$. In this case, the center position of the uncorrected weaving is preset to coincide with the weld line WL of the workpiece. Each time the arc breaks down, however, as shown in FIG. 5, the control system judges that a deviation ΔI has occurred and applies a correction such as $a_1$, $a_2$ or $a_3$ to the welding torch. This correction is unnecessary, as is apparent from the above description with reference to FIGS. 3, 4 and 5. This phenomenon is similar to that occurring when a control system having the characteristics of FIG. 1 is used, except that the correction $a_1$, $a_2$ or $a_3$ becomes the constant a.

Under welding conditions producing a low arc stability, an unstable breakdown of arc takes place. If this phenomenon occurs, a prior-art control system will correct the relative position of the welding torch and the weld line, even though the welding torch has not deviated from the weld line, in accordance with the change in the electrical quantity due to the breakdown. Therefore, especially when conditions producing such frequent arc breakdowns continue for a long time, the welding torch often deviates from the d line WL and, at worst, can completely separate from the weld line WL so that it is difficult to follow the weld line WL. As can be seen from FIG. 4, if an arc breakdown occurs, the electrical quantity of the welding torch indicating the arc length changes more than during the steady state. As a result, when a control system generating a predetermined correction x proportional to the deviation ΔI is used, as shown in FIG. 2, the deviation of the welding torch from the weld line WL is over-corrected, which increase the likelihood of the welding torch deviating from the weld line WL.

Figure 7:
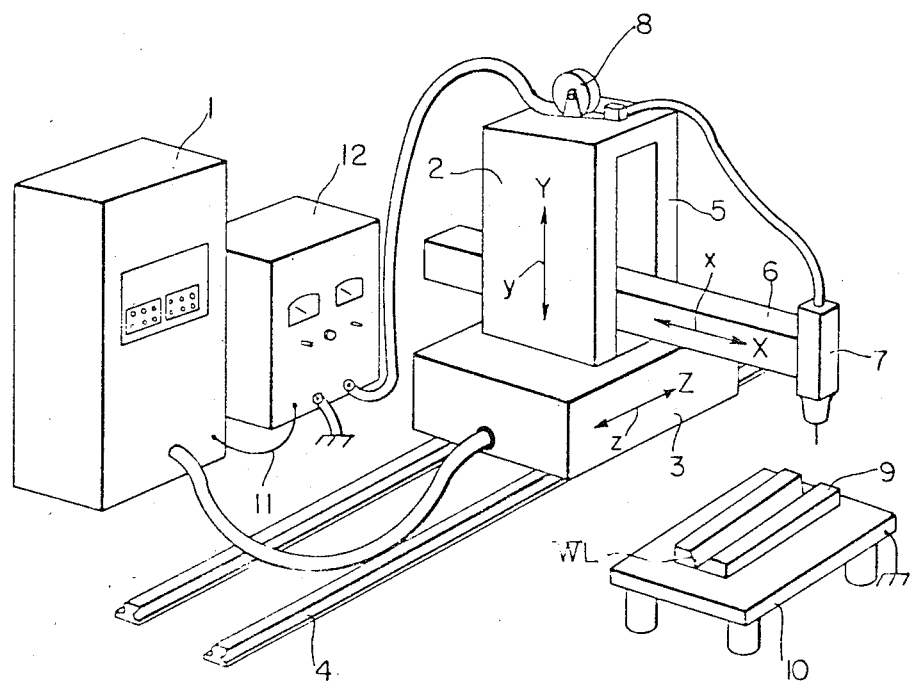
FIG. 7 is a view of the complete structure of an automatic welding apparatus to which the present invention is applied.

The present invention will be described in the following description in connection with one embodiment thereof, with reference to the accompanying drawings. FIG. 7 is a view of the complete structure of an automatic welding apparatus practicing the present invention. Reference numeral 1 denotes a controller for controlling each of the servo-motors of a movable unit 2, and also for practicing the control of the present invention. The movable unit 2 is provided with a vertical slide 5, a transverse carriage 6, a longitudinal truck 3, and longitudinal rails 4, the carriage and the truck being each driven by servo-motors. The welding system is equipped with a power source 12 acting as power supply means, a wire feeder 8, and a welding torch 7. Numeral 9 indicates a workpiece and 10 a workpiece holding bed for positioning the workpiece 9. The longitudinal truck 3 is able to move in the longitudinal direction, indicated by the arrow z, along the rails 4; and the transverse carriage 6 is able to move both in the vertical direction, indicated by the arrow y, relative to the vertical slide 5, and in the transverse direction, indicated by the arrow x. The movable unit 2 is driven by the drives of suitable servomotors which provide drive sources of these portions, to impart the motions necessary for operation or for weaving to welding torch 7 which is attached to the leading end of the transverse carriage 6. The controller 1 and the power source 12 are connected by a signal line 11 so that the value of the arc current during the welding operation can be input to the controller 1. The workpiece 9 is so positioned on the workpiece holding bed 10 that the weld line WL is roughly parallel to the rails 4. According to the construction thus far described, the speed of welding the workpiece 9 is determined by the velocity of the longitudinal truck 3. In the embodiment being described, the vertical slide 5 and the transverse carriage 6 are controlled so that highly-accurate welding is performed. For convenience, in the following description the vertical direction y, the transverse direction x, and the longitudinal direction z thus far described will be called the Y-axis, the X-axis and the Z-axis, respectively.

Figure 8:
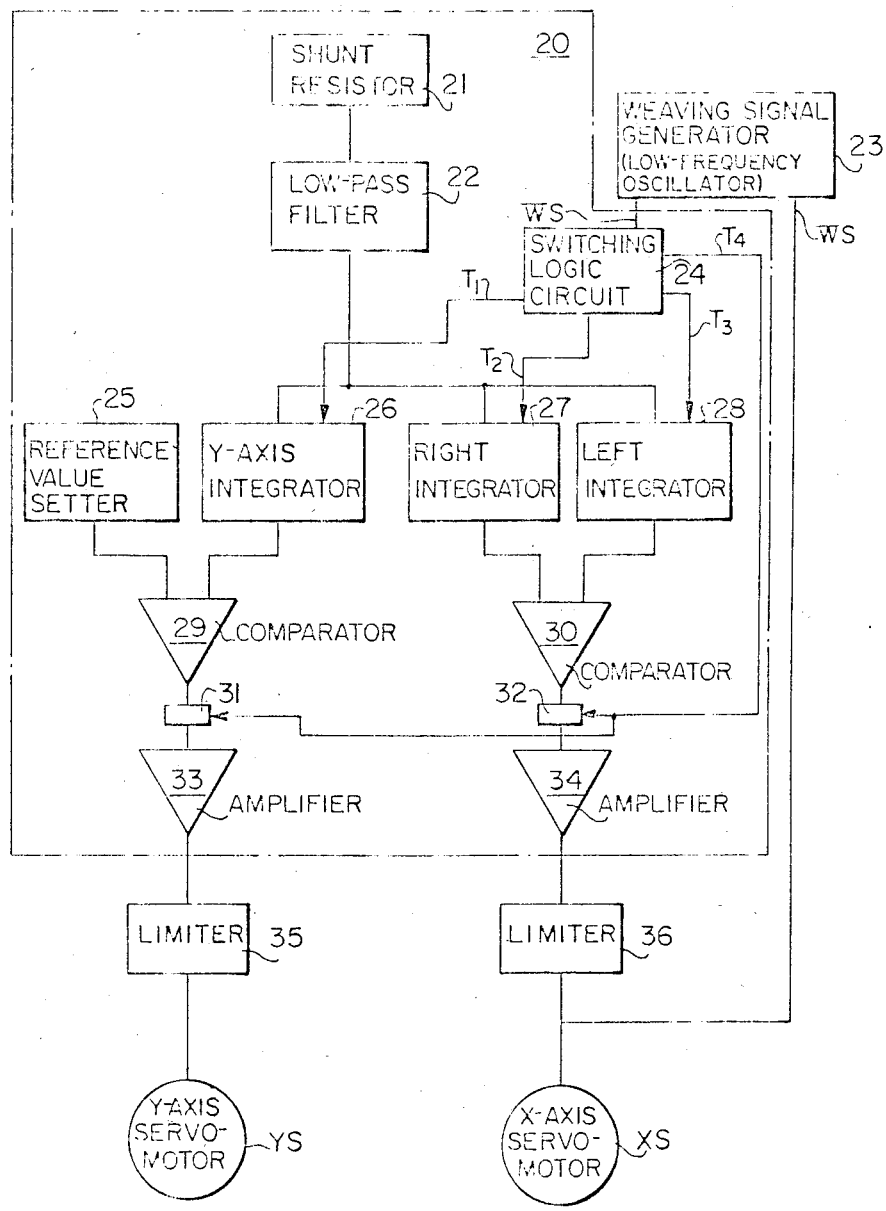
FIG. 8 is a block diagram of one embodiment of the present invention.
Figure 9:
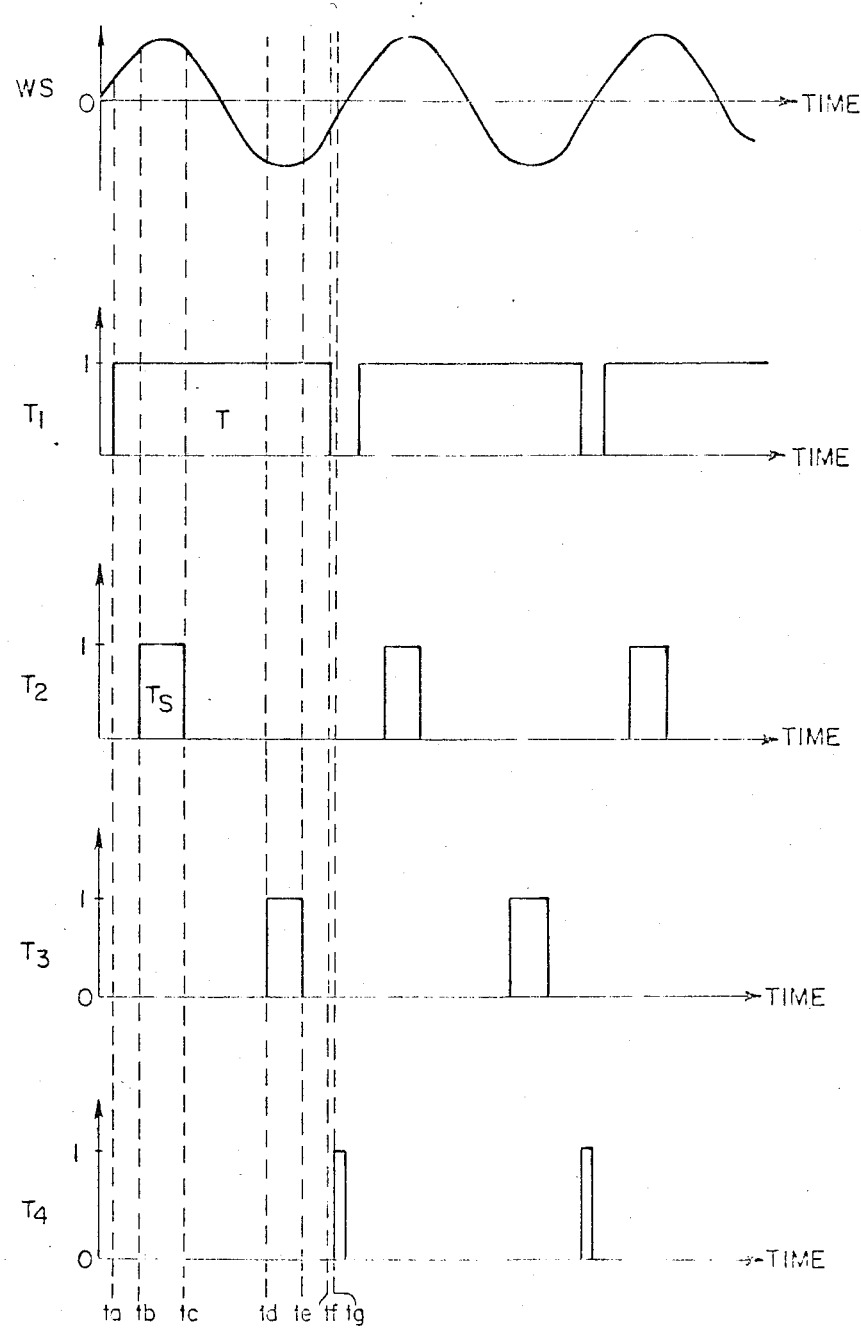
FIG. 9 is a timing chart of the signals of the various portions, for explaining FIG. 8.

FIG. 8 shows the control circuit constituting an essential portion of the present invention, which has the characteristics shown in FIG. 2 in the steady state. The following description will be made with reference to FIG. 8. A control means 20 is constructed in the following manner. Numeral 21 indicates a shunt resistor which is built into the power source 12 of FIG. 7 and converts the arc current during the welding operation into a low voltage suitable for the controller 1, and sends the low voltage to the controller 1. Numeral 22 indicates a lowpass filter which filters out the high-frequency components intrinsic to the arc as noise, from the arc current detected by the shunt resistor 21. Numeral 23 indicates a weaving signal generator for which a low-frequency oscillator of less than 10 Hertz is generally used. This weaving signal generator 23 has two outputs, one of these is sent with its waveform unchanged to an X-axis servo-motor XS to make the welding torch 7 weave. The other output is sent to a switching logic circuit 24 and is used for synchronizing the input and output of each of integrators which will be described below. The switching logic circuit 24 receives a weaving signal WS from the weaving signal generator 23, and generates predetermined timing signals $T_1$, $T_2$, $T_3$ and $T_4$ with reference to the weaving signal WS, as illustrated in FIG. 9. Numeral 25 indicates a reference value setter which is equipped with a setting means (not shown) and a memory for storing the set value, and which operates means to provide a value matching the appropriate welding current value or the like. Integrators 26, 27 and 28 are synchronized by the action of the switching logic circuit 24. The Y-axis integrator 26 integrates the arc current values while the timing signal $T_1$ is being input, i.e., over almost one period of the weaving waveform WS. The right integrator 27 receives the timing signal $T_2$ for conducting integration during only a predetermined time period TS in the vicinity of the righthand end of the weaving waveform WS. The left integrator 28 receives the timing signal $T_3$ for conducting a similar integration during only the time period TS in the vicinity of the lefthand end of the weaving waveform WS. Comparators 29 and 30 subtract values output from the reference value setter 25 and the Y-axis integrator 26, and from the right integrator 27 and left integrator 28 and output the substrated values as the deviation ΔI. Numerals 31 and 32 indicate gate circuits which receive the timing signal T4 from the switching logic circuit 24, and open their gates while the signal T4 is being input to pass therethrough the signals output from the comparators 29 and 30. Numerals 33 and 34 denote amplifiers which are composed of multipliers with multiplication factors of GY and GX, respectively.

Figure 10:
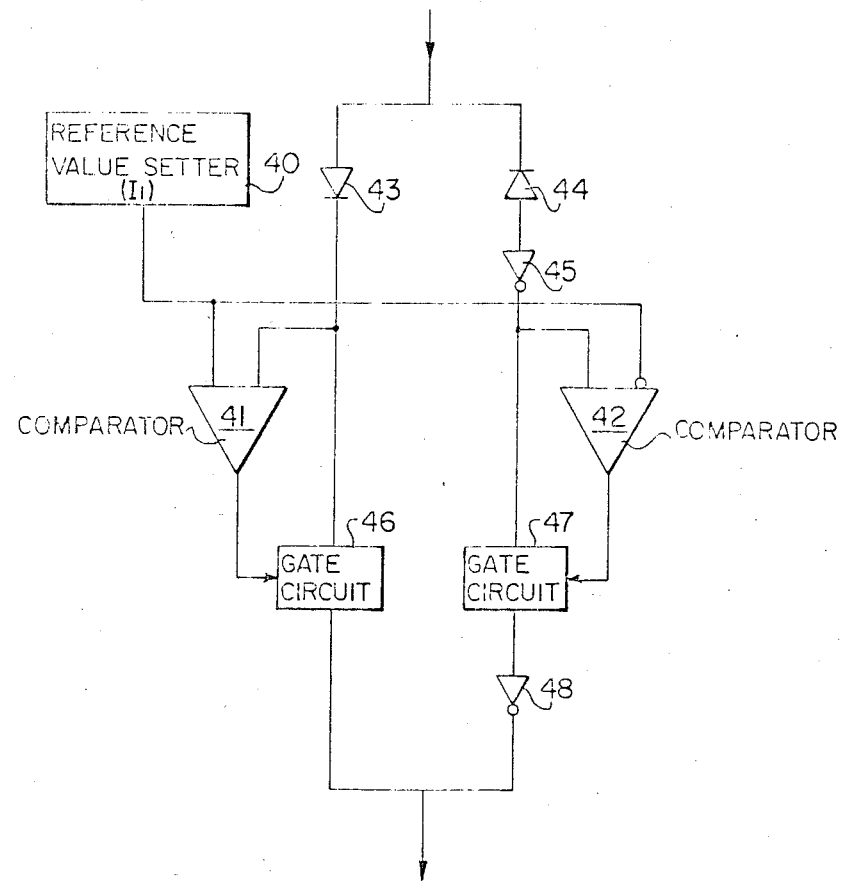
FIG. 10 is a block diagram of one example of the limit means.

Numerals 35 and 36 indicate limiters constituting limit means which are an essential part of the present invention. Each of the limiters 35 and 36 is constructed as shown in FIG. 10. A description will now be made with reference to the figure. Numeral 40 indicates a reference value setter which has a construction similar to that of the reference value setter 25 of FIG. 8, but is different therefrom in the value set thereby. Specifically, the value set by it is a predetermined value which can provide a discrimination between the arc current in the steady state and the arc current when the arc breaks down. This predetermined value can be determined in advance by experiments, etc. Reference numerals 41 and 42 indicate comparators, and numerals 43 and 44 diodes. As can be understood from the description thus far, the signals output from the amplifiers 33 and 34 deviate in the positive or negative direction. Therefore, the diodes 43 and 44 are connected in the opposite directions in series with the corresponding amplifiers 41 and 42 so that a component in the positive direction is extracted by the diode 43, whereas a component in the negative direction is extracted by the diode 44. A component in the negative direction is inverted by an inverter 45. The positive component is output through a gate circuit 46 whereas the negative component is output through a gate circuit 47 and an inverter 48. The comparator 41 judges whether or not the output from the diode 43, i.e., the positive component of the arc current, exceeds the predetermined value set by the reference value setter 40, and outputs a corresponding signal and closes the gate circuit 46 if it does exceed that value. Similarly, the comparator 42 judges whether or not the output from the diode 44 inverted by the inverter 45 exceeds the predetermined value, and outputs a corresponding signal and closes the gate circuit 47 if it does exceed that value. The output from the gate circuit 46 is sent out unchanged and the output from the gate circuit 47 is sent out through the inverter 48, as outputs from the limiters 35 and 36, respectively.

The corrections x output from the amplifiers 33 and 34 through the limiters 35 and 36 are input to the Y-axis servo-motor YS and the X-axis servo-motor XS, respectively. The Y-axis servo-motor YS is mounted in the vertical slide 5 of FIG. 7, and moves and drives the welding torch 7 to a height corresponding to instruction signals, etc. The X-axis servo-motor XS drives the transverse carriage 6 of FIG. 7 to weave the welding torch 7 and move it in the X-axis direction. Although not shown, a Z-axis servo-motor is provided as the servo-motor for moving the truck 3 in the Z-axis direction in response to instruction signals from the controller 1. The X-axis, Y-axis and Z-axis servo motors constitute the main drive source for moving and controlling the welding torch 7 along the weld line WL. In FIG. 8, however, only the servo-motors YS and XS and the weaving signal generator 23 are shown as the movement control means. However, this movement control means also includes, as in the prior art, a memory unit acting as a setting unit for presetting the path of the welding torch 7, and a control unit for driving and controlling each of the servo-motors in accordance with the values stored in the memory unit. In FIG. 8, the outputs of the limiters 35 and 36 are applied directly to the servo-motors YS and XS, but in fact they are applied through control circuits to the servo-motors YS and XS. It should be understood that the control circuits are omitted for the purpose of simplicity.

Figure 11:
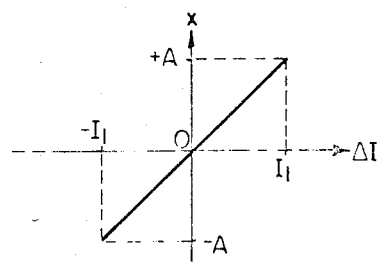
FIG. 11 shows the control characteristics of the embodiment.

As is apparent from the description of FIG. 10, the limiters 35 and 36 output the input signals through the gate circuits 46 and 47, and the gate circuits 46 and 47 are opened and closed by the outputs from the comparators 41 and 42. If the value of an input signal is within the value preset by the setter 40, therefore, the gate circuits 46 and 47 are opened to output the input signal unchanged. If the value of an input signal exceeds the value set by the setter 40, however, the gate circuits 46 and 47 are closed to block the input and output signals so that the outputs of the limiters 46 and 47 are zero. FIG. 11 shows the control characteristics of the control circuit in which the limiters 35 and 36 are provided, as shown in FIG. 8, corresponding to the case in which a value $I_1$ is set in the setter 40. This set value $I_1$ is a value that can discriminate between the value of the arc current in the steady state and that when the arc breaks down, and can be determined in advance by experiments, etc. In the control system of the present embodiment, more specifically, the correction x increases in proportion to the deviation ΔI, as in the control system of FIG. 2, within the range from $ΔI_1$ to $−ΔI_1$. If this range is exceeded, however, i.e., if the arc breaks down, the correction x is forced back to zero. Incidentally, the value set by the setter 40 of the limiter 35 and the value set by the setter 40 of the limiter 36 are specifically different from each other. To keep the description simple, the following assumes that those two set values are equal to each other.

Figure 6:
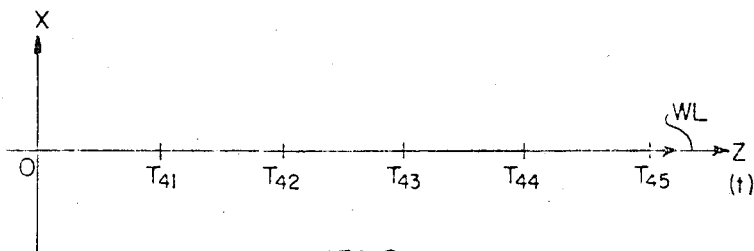
FIG. 6 shows the locus of the center position of the weaving in an embodiment of the present invention.

The operations of the embodiment will be explained in the following with reference to FIGS. 3, 4 and 6. Of these, FIG. 3 shows the weaving signal waveform, as stated above, and corresponds to the output of the weaving signal generator 23 of FIG. 8. FIG. 4 shows the welding current, i.e., the arc current waveform, and corresponds to the output of the low-pass filter 22 of FIG. 8. FIG. 6 shows the locus of the center position of the weaving of the welding torch of the present embodiment. In the steady state, the welding torch 7 is moved by the movable unit 2 which in turn is moved by the controller 1 in accordance with movement path data preset in the controller 1. When the timing signal $T_1$ is output from the switching logic circuit 24 at a time ta in FIG. 9, the Y-axis integrator 26 responds to that signal $T_1$ to integrate the arc current from the low-pass filter 22 for a period from time ta to a time tf. The right integrator 27 responds to the timing signal $T_2$ output at a time tb from the switching logic circuit 24, to integrate the arc current from the low-pass filter 22 during a period Ts to a time tc. Similarly, the left integrator 28 responds to the timing signal $T_3$ output at a time td from the switching logic circuit 24, to integrate the arc current from the low-pass filter 22 during the period Ts to a time te. The value thus integrated by the Y-axis integrator 26 and the value set by the reference value setter 25, and the values integrated by the right integrator 27 and the left integrator 28 are always compared by the actions of the comparators 29 and 30 so that any deviation therein is always output. However, such deviations are blocked by the gate circuits 31 and 32 so that they are not input to the amplifiers 33 and 34. If the timing signal $T_4$ is output from the switcing logic circuit 24 at a time tg after the Y-axis integrator 26, the right integrator 27, and the left integrator 28 have ended their integrations of the arc current during their respective predetermined periods, both the gate circuits 31 and 32 are opened so that the outputs from the comparators 29 and 30 are input to the amplifiers 33 and 34. The amplified deviations are input through the limiters 35 and 36 to the Y-axis servo-motor YS and the X-axis servo-motor XS, respectively, so that the welding torch 7 is corrected and driven by corrections corresponding to these deviations. If the welding torch 7 comes closer to or further from a desired distance from the weld line WL in the Y-axis direction, a difference is generated between the value set by the setter 25 and the value integrated by the Y-axis integrator 26, and this is detected by the comparator 29. In accordance with that deviation, the Y-axis servo-motor YS adjusts the position of the welding torch 7 in the Y-axis direction so as to reduce the deviation to zero. If the center position of the weaving pattern deviates from the weld line WL to the right or left, on the other hand, a difference occurs between the values integrated by the right and left integrators 27 and 28. The comparator 30 then detects the difference therebetween so that the X-axis servo-motor XS is driven and controlled by that detected value. This control is continued until the center position of the weaving pattern coincides with the weld line WL. Thus the welding torch 7 is controlled so as to follow the weld line WL. Although omitted from the foregoing description, it is obvious that each of the integrators 26, 27 and 28 are cleared during the time period after the disappearance of the timing signal $T_4$ and before the rise of the timing signal $T_1$.

The description thus far made is directed to the general case in which the arc does not break down, i.e., when the deviation $\Delta I$ is within the range from $\Delta I_1$ to $-\Delta I_1$ of FIG. 11. Since, in this case, the outputs of the amplifiers 33 and 34 do not exceed the value $I_1$ set by the setter 40, both the gate circuits 46 and 47 are open so that the outputs of the amplifiers 33 and 34 are applied unchanged to the servo-motors YS and XS through the limiters 35 and 36. Assume that the arc breaks down at the times $t_1$, $t_2$, $t_3$, $t_4$ and $t_5$ of FIG. 4. With this assumption, the influence of the arc breakdown at time $t_1$ first appears on or after a time $T_{41}$ at which the timing signal $T_4$ is generated, as shown in FIG. 6. Differences are caused by the arc breakdown at time $t_1$ between the value set by the setter 25 and the value integrated by the Y-axis integrator 26, and between the values integrated by the right integrator 27 and the left integrator 28. The servo-motors YS and XS are basically controlled in accordance with those differences. However, these differences are caused by an arc breakdown and have a considerably larger value. In other words, the differences exceed the set value $I_1$ of FIG. 10. The comparators 41 and 42 detect that value to open the gate circuits 46 and 47. As a result, no signal based upon the differences is output from the limiters so that the servo-motors YS and XS are not moved but are held in their previous state. Even for an arc breakdown at times $t_2$, $t_3$, $t_4$ or $t_5$, the limiters 35 and 36 act to limit the outputs in a similar manner, so that the resultant deviation is ignored. As shown in FIG. 6, more specifically, the locus of the center position of the weaving pattern is carried along the weld line WL without being adversely affected by any arc breakdown.

Figure 12:
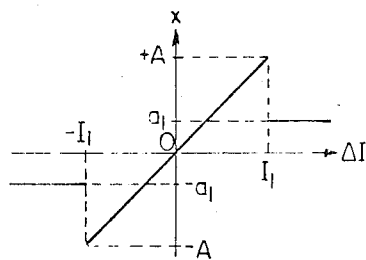
Figure 13:
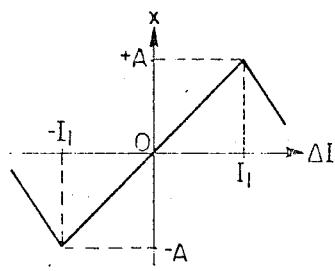
Figure 14:
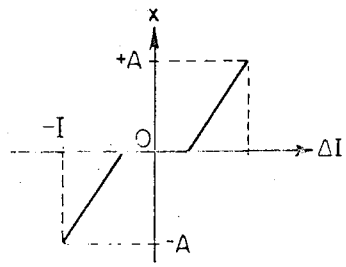

The foregoing description of the embodiment has been directed to the case in which a workpiece with a weld line WL is fixed, and the welding torch 7 is moved relative to the weld line WL. However, the welding torch 7 may be fixed while the weld line WL is moved. In the embodiment thus far described, moreover, the correction X is reduced to zero when the deviation $\Delta I$ exceeds the predetermined quantity $\Delta I_1$. That correction need not be zero, but the effects of the present invention can still be sufficiently achieved if the correction is smaller than that corresponding to the deviation. FIG. 12 shows on example in which the correction x is set at a quantity $\pm a_1$ when the deviation $\Delta I$ exceeds the predetermined quantity $\Delta I_1$. Moreover, the limited correction x need not always be a constant but may gradually decrease, as shown in FIG. 13. FIG. 14 shows another example in which the control characteristics of the correction control means have a dead zone. The present invention can be applied no matter what characteristics the correction control means has. The value or characteristic that the limited correction should be selected for is determined by the automatic welding apparatus to which the present invention is applied, or by the properties of the workpiece, but the correction is generally preferably zero.

Figure 15:
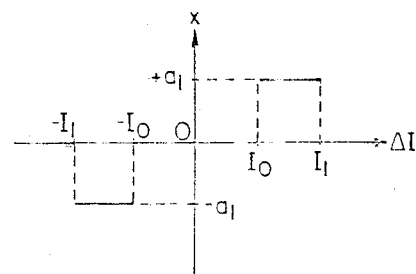
FIGS. 12, 13, 14, 15, 16 and 17 show the control characteristics of other embodiments of the present invention.
Figure 16:
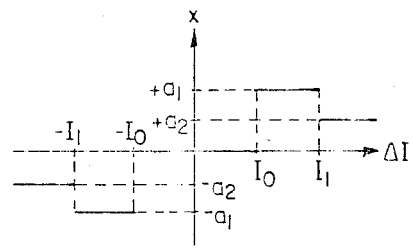
Figure 17:
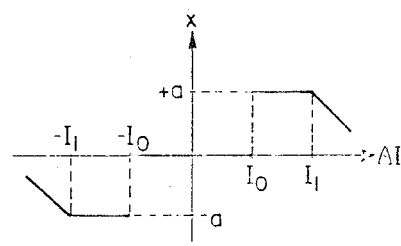

In the above description of the embodiment, moreover, the correction x increases generally in proportion to the deviation $\Delta I$ when the absolute value of the deviation $\Delta I$ is less than the predetermined value $I_1$. The embodiment can be applied to the control system of FIG. 1 which provides a constant correction x regardless of the magnitude of the deviation $\Delta I$. The characteristics of this case are shown in FIG. 15. Even in this case, incidentally, the correction x may be selected to be not zero, but the small value $\pm a_1$, when the deviation $\pm \Delta I$ exceeds the predetermined value $\pm I_1$. For example, FIG. 16 shows a case in which the correction is limited to the value $a_1$ when the absolute value of the deviation $\pm \Delta I$ exceeds the predetermined value $I_o$ and is limited to a lesser value $\pm a_2$ when the absolute value of the deviation exceeds a predetermined value $I_1$; and FIG. 17 shows a case in which the correction x is gradually decreased when the absolute value of the deviation exceeds the predetermined value $I_1$.

In these embodiments, whether or not the deviation between the detected electrical quantity and the predetermined reference quantity exceeds a predetermined value is judged in terms of the deviation at the output position of the correction control means 20. However, this judgement may be based on the deviation of the outputs of the comparators 29 and 30, for example. The present invention should not be limited to the positions at which the deviations are detected.

In the above description, the detection of the electrical quantity corresponding to the arc of the welding torch uses the amplitude of the arc current as an example. However, the voltage of the welding torch may be detected, as has been stated before.

As is apparent from the description thus far made, according to the present invention, when the arc breaks down, the resultant deviation is ineffective. It is, therefore, possible to provide a weld line profile-control system which has excellent following characteristics, even under conditions of low arc stability.

We claim:

1. A system for controlling weld line profile, comprising:
   means for controlling the relative movement of apparatus for guiding an electrical arc torch for welding to follow a welding line;
   correction means for storing a reference quantity, for detecting an electrical quantity corresponding to the state of the arc of said torch, and for providing a predetermined correction signal to said controlling means in accordance with deviations between said detected quantity and said reference quantity; and
   means responsive to said correction means for limiting the value of said correction signal to a quantity smaller than a predetermined quantity corresponding to said deviations when said deviations exceed a predetermined value corresponding to the value of an electrical characteristic of said arc during a breakdown state of said arc.

2. The system of claim 1, wherein said limiting means reduces the value of said correction signal to zero when said deviation exceeds said predetermined value wherein said predetermined value represents the value of the arc current during a breakdown state of the arc of said torch.

3. The system of claim 1, wherein said correction means provides a predetermined correction which increases in proportion to said deviation when said deviation is less than a predetermined value.

4. The system of claim 1, wherein said controlling means includes a weaving signal generator generating a low-frequency signal and a servo-motor making said welding torch weave under the influence of said signal, said correction means includes a pair of integrators and a comparator, one of said integrators integrating the arc current value as said detected quantity corresponding to the arc of one side weaveform of said welding torch, the other of said integrators integrating the arc current value as said reference quantity corresponding to the arc of the other side weaveform of said welding torch, said comparator subtracting values output from said one integrator and the other integrator and providing to said limiting means a subtracted value as the deviation value quantity.

5. The system of claim 1, wherein said controlling means includes a weaving signal generator generating low-frequency signal and servo-motor making said welding torch weave under said signal, said correction means includes a reference value setter, an integrator and a comparator, said integrator integrating an arc current value as said detected quantity over almost one period of the weaveform of said welding torch, said reference value setter storing a set value as said reference quantity, said comparator subtracting values output from said reference value setter and said integrator and outputting a subtracted value as said deviation to said limiter means.

6. The system of claim 1, wherein said limiting means reduces the value of said correction signal to zero when said deviation exceeds said predetermined value wherein said predetermined value represents the value of the voltage of the electrical arc torch during a breakdown state of the arc of said torch.

7. A system for controlling weld line profile, comprising:
   means for controlling the relative movement of apparatus for guiding an electrical arc torch for welding to follow a welding line;
   correction means for storing a reference quantity, for detecting an electrical quantity corresponding to the state of the arc of said torch, and for providing a predetermined correction signal to said controlling means in accordance with deviations between said detected quantity and said reference quantity; and
   means responsive to said correction means for limiting the value of said correction signal to zero when said deviations exceed a predetermined value.

8. The system of claim 7, wherein said predetermined value corresponds to the value of an electrical characteristic of said arc occurring during a breakdown state of said arc.

9. A system for controlling weld line profile, comprising:
   means for controlling the relative movement of apparatus for guiding an electrical arc torch for welding;
   means for detecting an electrical quantity corresponding to the state of the arc of a welding torch;
   means for comparing said electrical quantity with a reference quantity for detecting any difference between the values of said electrical and reference quantities, and for providing a predetermined correction signal to said controlling means for correcting the relative movement of the welding torch in accordance with deviations between said quantities; and
   means for limiting the value of said correction signal to zero when said deviations exceed a predetermined value.

10. The system of claim 9, wherein said comparing means includes a comparator responsive to differences between said electrical quantity and said reference quantity to provide a deviation signal between said quantities and means for amplifying said deviation signal to provide an amplified deviation signal to said limiting means.

11. The system of claim 10, wherein said amplifier provides a predetermined correction which increases in proportion to said deviation signal when the value of said deviation signal is less than said predetermined value.

12. The system of claim 9, wherein said limiting means includes a reference value setter holding a reference value, a comparator comparing said value of said correction signal with said reference value and a gate circuit controlled by the output of said comparator, said reference value being said predetermined value and representing the value of the arc current during a breakdown state of the arc of said torch, said gate being controlled to limit said correction signal to zero when the value of said correction signal exceeds said reference value.

13. The system of claim 12, wherein said drive circuit is closed by the result of said comparator to limit the value of said correction signal to zero when the value of said correction signal exceeds said reference value.

14. The system of claim 12, wherein said predetermined value corresponds to the value of an electrical characteristic of said arc occurring during a breakdown state of said arc.

15. The system of claim 9, wherein said predetermined value corresponds to the value of an electrical characteristic of said arc occurring during a breakdown state of said arc.

16. A method for controlling weld line profile, comprising:
  detecting an electrical quantity corresponding to the arc of a welding torch;
  providing a predetermined correction for the movement of said torch in accordance with any deviation between said electrical quantity and a reference quantity;
  comparing said deviation with a predetermined value to provide a limitation signal;
  limiting said correction in response to the value of said limitation signal to zero when said deviation exceeds said predetermined value; and
  applying said correction to control the relative movement of said torch to follow a weld line.

17. The method of claim 16, further comprising the step of making no correction movement when said deviation exceeds said predetermined value.

18. The method of claim 16, further comprising the step of providing a predetermined correction increasing in proportion to said deviation when said deviation is less than a predetermined value.

19. The method of claim 16, further comprised of comparing said electrical quantity corresponding to the arc current of a welding torch with said reference quantity to detect a deviation between said quantities.

20. The method of claim 16, further comprising comparing said deviation with a predetermined value representing the arc current during a breakdown state state of the arc of said torch to provide said limitation signal.

21. The system of claim 16, wherein said predetermined value corresponds to the value of an electrical characteristic of said arc occurring during a breakdown state of said arc.

22. A system for controlling weld line profile, comprising:
  means for controlling the relative movement of an apparatus for guiding an electrical arc welding torch to follow a weld line, having a weaving signal generator generating a low-frequency signal and a servo-motor making said welding torch weave under the influence of said weaving signal;
  correction means having a pair of integrators and a comparator, one of said integrators integrating the value of an electrical characteristic of the arc of said welding torch to obtain an electrical quantity corresponding to the state of the arc during one side weaveform of said welding torch, the other of said integrators integrating the arc current value to obtain a reference quantity corresponding to the state of the art during the other side weaveform of said welding torch, said comparator subtracting values of one of said quantities from that of the other of said quantities and providing a correction signal proportional to the difference between said quantities to said controlling means; and
  means having a reference value setter holding a reference value, a comparator comparing said value of the correction signal with said reference value and a gate circuit controlled by the output of said comparator, said reference value being a predetermined value representing the value of the electrical characteristic during a breakdown state of the arc of said torch, for limiting the value of said correction signal by controlling said gate to limit said correction signal to a predetermined amplitude when the value of said correction signal exceeds said reference value.

* * * * *